US007281468B2

(12) United States Patent
Frem

(10) Patent No.: US 7,281,468 B2
(45) Date of Patent: Oct. 16, 2007

(54) AUTOMATIC SANDWICH DISPENSER AND METHOD FOR AUTOMATICALLY DISPENSING SANDWICHES

(76) Inventor: Neemat Frem, Jounieh (LB)

( * ) Notice: Subject to any disclaimer, the term of this patent is extended or adjusted under 35 U.S.C. 154(b) by 790 days.

(21) Appl. No.: 10/369,730

(22) Filed: Feb. 21, 2003

(65) Prior Publication Data

US 2003/0155369 A1 Aug. 21, 2003

(30) Foreign Application Priority Data

Feb. 21, 2002 (EP) ................................ 02290428

(51) Int. Cl.
*A21D 13/08* (2006.01)
*A23L 1/31* (2006.01)
*B65B 25/16* (2006.01)
*G07F 11/70* (2006.01)

(52) U.S. Cl. ......................... 99/334; 99/357; 99/450.4; 99/484

(58) Field of Classification Search .................. 99/355, 99/357, 387, 450.4, 450.5, 325, 334, 484; 221/79, 80, 81, 92, 76, 224, 150 HC
See application file for complete search history.

(56) References Cited

U.S. PATENT DOCUMENTS 1,973,195 A 9/1934 Ankcorn
3,855,912 A * 12/1974 Schoonmaker et al. .... 99/450.4
3,859,904 A * 1/1975 Carriazo .................... 99/450.4
4,685,387 A * 8/1987 Hanson et al. ............ 99/450.4
4,944,218 A * 7/1990 Cresson ....................... 99/357
5,359,925 A 11/1994 Forker
5,522,310 A 6/1996 Black, Sr. et al.
5,540,943 A * 7/1996 Naramura .................. 426/274

FOREIGN PATENT DOCUMENTS

EP 0 601 954 A1 6/1994

* cited by examiner

*Primary Examiner*—Reginald L. Alexander
(74) *Attorney, Agent, or Firm*—Bacon & Thomas PLLC

(57) ABSTRACT

In order to dispense fresh sandwiches at any place and at all hours, this invention proposes an automatic sandwich dispenser which comprises a plurality of compartments in which whole fresh ingredients are stored. The dispenser comprises automatic sandwich making means which may be positioned opposite each compartment and which comprises arms for gripping and manipulating the compartments. When a consumer enters an order, the automatic sandwich making means slices each selected ingredient in a bread roll with the aid of a cutting device. Once the bread roll is filled with all the selected ingredients, the sandwich is delivered to the consumer.

14 Claims, 12 Drawing Sheets

AUTOMATIC SANDWICH DISPENSER AND METHOD FOR AUTOMATICALLY DISPENSING SANDWICHES

FIELD OF THE INVENTION

The present invention relates to the domain of automatic dispensers and more particularly to the domain of automatic dispensing of food products such as sandwiches.

BACKGROUND OF THE INVENTION

In often frequented public or private places, a large variety of automatic dispensers of food products are frequently present. Whether it be question of cold products such as sandwiches, or of hot products such as pizzas or hamburgers, these products are always made up in the factory and stored at low temperature in the dispenser until a consumer purchases them. In that case, the role of the dispenser is limited to delivering and possibly heating up one of the products previously made in the factory.

Although they are of generally acceptable quality, these products do not offer the consumer a flavour equivalent to that of the same product made up to order from whole fresh ingredients, due to the time that they spend in the dispenser and to the conserving products added for their preservation.

This problem of flavour is very sensitive as far as sandwiches are concerned. Namely, a sandwich is mainly composed of two slices of bread between which perishable ingredients (ham, eggs, tomatoes, lettuce, . . . ) are arranged. These ingredients must, in most cases, be sliced before being placed in the bread. It is known that an ingredient such as a tomato or an egg for example, spoils much more quickly when it is sliced than when it is whole. For a given duration of conservation, vegetables, fruits or even meat, keep their flavour and freshness much better when whole. Consequently, after it has been made, a sandwich must be consumed rapidly if the flavour of the sandwich ingredients is to remain intact. However, for practical and economic reasons, present-day sandwich dispensers cannot be supplied with sandwiches sufficiently often to be able to deliver fresh and tasty products at all times. Moreover, the whole sandwich, i.e. the bread with the ingredients, is stored at a relatively low temperature for conservation purposes. Consequently, when the consumer buys a sandwich, the bread which is generally appreciated at ambient temperature, is at the same temperature as the ingredient. This is even more detrimental to the overall flavour of the product.

At the present time, certain fast-food establishments deliver sandwiches to order. However, such establishments have relatively high investment and management costs. Namely, a fast-food establishment involves the employment of staff and the renting or purchase of premises. Moreover, this type of establishment generally has opening hours which do not allow sandwiches to be offered at all times.

It is an object of the present invention to overcome the drawbacks set forth hereinabove and to produce, economically, an automatic sandwich dispenser which enables sandwiches to be automatically made from whole fresh ingredients, to order, while requiring minimum manpower to keep it supplied.

SUMMARY OF THE INVENTION

These objects are attained with an automatic sandwich dispenser comprising a means for storing and conserving fresh ingredients, a means allowing a consumer to order a sandwich, a means for automatically making a sandwich which cooperates with said means for storing and conserving the fresh ingredients in order, in response to the consumer's order, to slice the fresh ingredients and to fill a bread roll with the slices of ingredients, and a means for delivering the prepared sandwich.

Thanks to the sandwich dispenser of the present invention, sandwiches made up from fresh ingredients can thus be delivered to a consumer at any moment. The sandwiches are prepared to order without requiring human intervention. The dispenser according to the invention consequently constitutes an economic solution which allows tasty sandwiches to be dispensed at any place and at any time.

More particularly, the storage and conservation means comprises one or more compartments in which the fresh ingredients are stored, the compartments being arranged in a refrigerated enclosure.

According to a particular aspect of the invention, the means for storing and conserving fresh ingredients comprises an opening. The automatic sandwich making means comprises a cutting device, the opening being adapted to receive said cutting device above the bread roll.

According to another aspect of the invention, the automatic sandwich making means comprises means for automatically handling the fresh ingredient storage means in order to position the opening vertically with respect to the cutting device and the bread roll.

The automatic sandwich making means further comprises a jack which cooperates with a mobile part of the storage means in order to reposition the ingredient in the opening when the ingredient has been sliced.

The automatic sandwich making means also comprises a holding means for holding the bread roll in a determined position while the sandwich is being made. The holding means may further comprise a pair of spreader elements in order to maintain the bread roll open.

According to a characteristic of the invention, the ordering means comprises means for selecting the ingredients to allow the consumer to choose the composition of the sandwich. This means may further comprise means for payment.

According to a particular aspect of the invention, the dispenser further comprises a device for automatically making the bread roll and a means for transferring, on the one hand, the bread roll from the automatic bread roll making device to the automatic sandwich making means, and, on the other hand, from the automatic sandwich making means to the delivery means.

The present invention also relates to a method for automatically dispensing sandwiches, characterized in that it comprises a step of storing fresh ingredients in a storage and conservation means in a dispenser which comprises automatic sandwich making means, a step of automatically slicing the stored fresh ingredients in a bread roll in response to an order from a consumer, and a step of delivering the sandwich thus made.

Consequently, thanks to the sandwich dispensing method according to the invention, sandwiches are automatically made from whole fresh ingredients, which enables tasty sandwiches to be permanently delivered since they are made for the consumer to order.

According to a characteristic of the present invention, the storage means is removable, and a prior step of filling the storage means with the fresh ingredients in a packing centre and a step of positioning the storage means in the dispenser are carried out.

The step of filling the storage means with fresh ingredients in a packing centre may be carried out as a function of the information on the stocks of ingredients transmitted by the dispenser.

The method of the invention further comprises a step of replacing an empty storage means in the dispenser by another full storage means.

The method according to the invention may further include a step for automatically making the bread roll.

BRIEF DESCRIPTION OF THE DRAWINGS

The invention will be more readily understood on reading the following description of particular forms of embodiment of the invention, given by way of non-limiting examples, with reference to the accompanying drawings, in which.

DESCRIPTION OF PREFERRED EMBODIMENTS

In order to simplify the drawings and being given the number of parts constituting the automatic sandwich dispenser according to the present invention, only those parts useful for understanding the invention will be described in detail. The other conventional structural or functional parts of such an apparatus can be envisaged without particular difficulty by the person skilled in the art. From a general point of view, the automatic sandwich dispenser is provided to be placed in any public or private place and to deliver to a consumer a sandwich composed of bread and fresh ingredients, to order.

Figure 1:
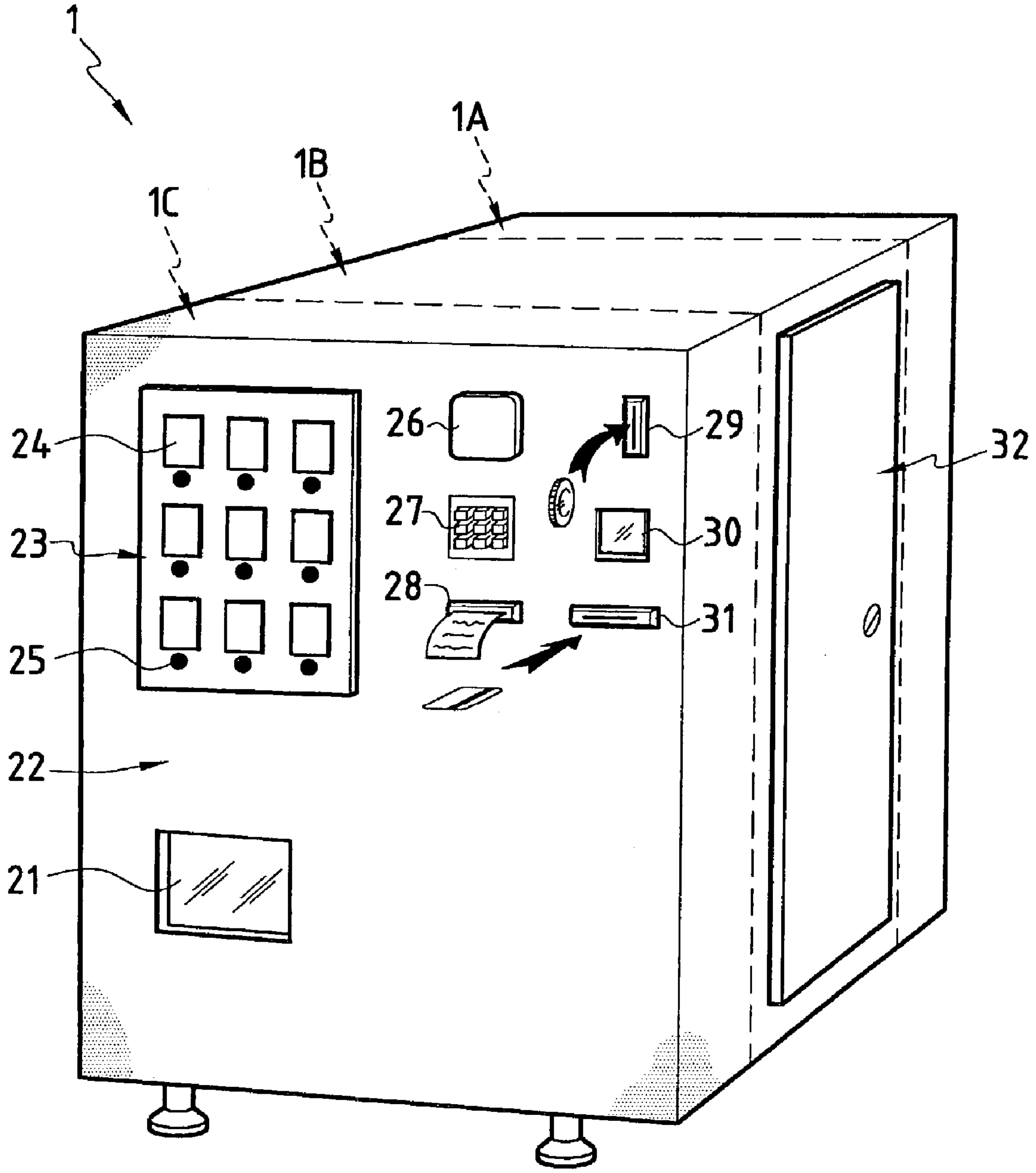
FIG. 1 is a view in perspective of the automatic sandwich dispenser according to a form of embodiment of the invention.

Referring now to the drawings, and firstly to FIG. 1, a dispenser 1 comprises to that end a front face 22 on which are arranged all the elements necessary for the consumer to order, pay and obtain a sandwich. Concerning the elements for ordering the sandwich, the dispenser presents a panel 23 which comprises labels or photos 24 of the different ingredients proposed, each associated with a button 25 for selecting the corresponding ingredient. The composition of the sandwich may also be ordered via a keypad 27 associated with a screen 26 to guide the consumer in his order. For payment of the sandwich, when this is required, the dispenser 1 presents a coin-slot 29, a change return 30 and/or a means 31 for payment by credit card. The dispenser may further be provided with a receipt delivery means 28. When the sandwich has been made, it is placed at the consumer's disposal behind a flap 21. The dispenser 1 also comprises a door 32 to allow it to be filled or refilled with whole fresh ingredients.

The sandwich dispenser 1 also comprises processing means (not shown) of the programmable microprocessor type with associated memories. The movements of the different mechanisms of the machine are thus controlled, the stock of ingredients is managed, and the selection and payment by the consumer are taken into account by specific computer programmes stored and employed by the microprocessor, in conventional manner. For example, the order of filling of the ingredients in the sandwich may be the one in which the consumer has selected the ingredients or may be defined by a programme which calculates, depending on the selection of ingredients made by the consumer, the preferential order in which the selected ingredients must be placed in the bread.

The sandwich dispenser 1 is mainly composed of three parts: a part 1A for preparation of the bread roll, a part 1B for preparation of the sandwich in which the bread roll is filled with ingredients as a function of the selection made by the consumer, and a part 1C which corresponds to the front part of the machine and which comprises in particular the means for selection and payment by the consumer as well as means for delivering the prepared sandwiches.

Figure 2:
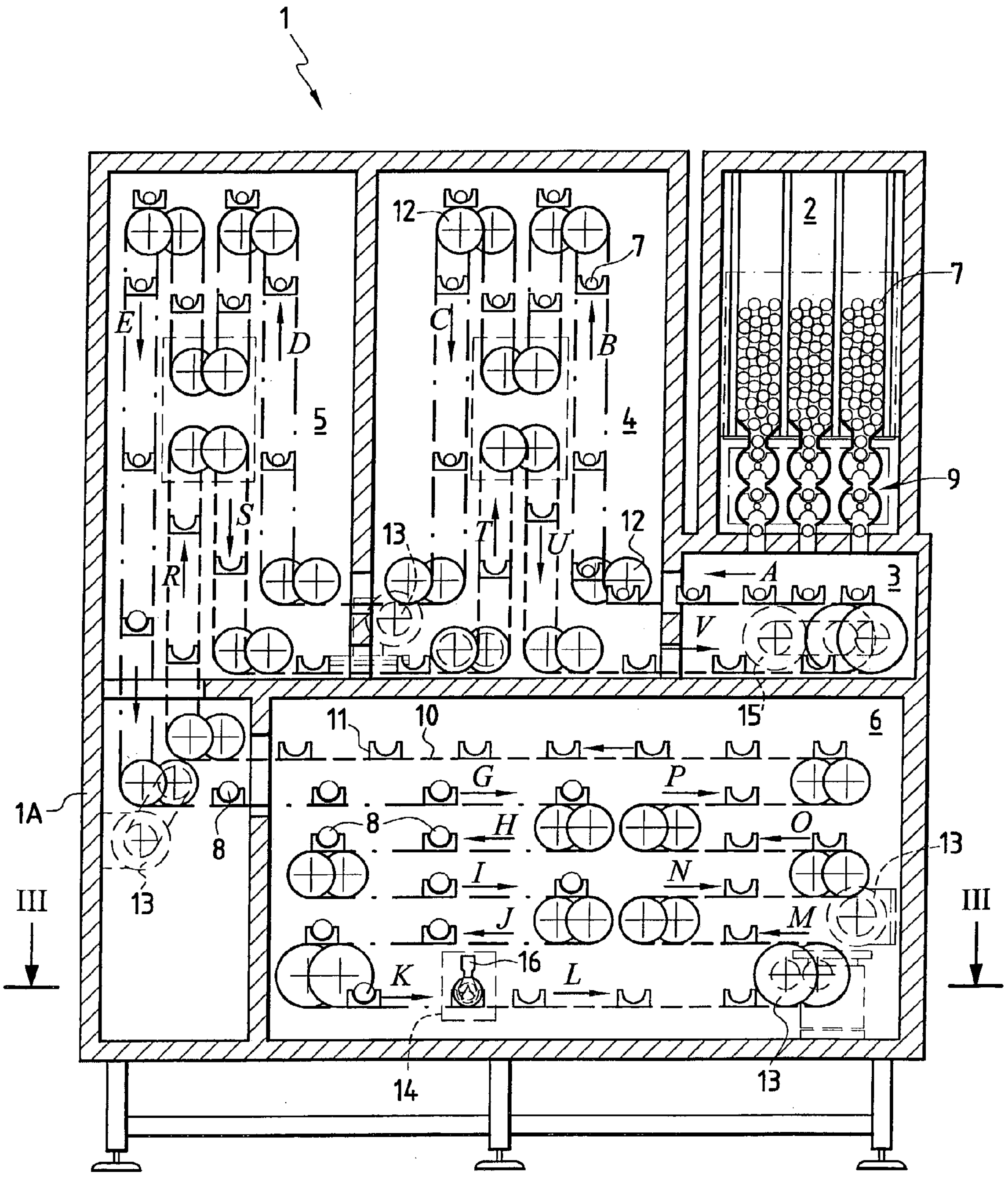
FIG. 2 is a view in vertical section of part 1A of the dispenser of FIG. 1.

As illustrated in FIG. 2, part 1A for preparing the bread roll for sandwiches comprises a plurality of compartments 2 to 6 which correspond to the different steps of preparing the bread roll for a sandwich. Pieces of frozen dough 7 each corresponding to the quantity necessary for making bread for a sandwich are stored in a freezer compartment 2. Each piece of frozen dough 7 is deposited, by a drum mechanism 9, in a mould 11, element of a conveyor chain 10 inside a departure compartment 3. In the form of the embodiment illustrated in FIG. 2, the pieces of dough 7 are extracted, for example, in three's and each deposited by gravity in a mould 11 of the conveyor chain 10. The conveyor chain 10 is an endless chain which comprises a plurality of moulds 11 distributed over its length. The moulds 11 then circulate in all the compartments of part 1A of the machine in a direction of displacement of the chain indicated by arrows A to V. The configuration of the path covered by the chain 10 is defined by a series of guides 12. The chain is set in motion by a series of motors 13. Means (not shown) for disengaging the moulds 11 from the chain 10 are provided to allow the moulds to approach one another in the departure zone 3.

Once deposited on moulds 11, the pieces of dough 7 are firstly conveyed into a pre-baking compartment 4 which serves mainly to defrost the dough then into a final baking compartment 5 in order to obtain a bread roll 8, the basic ingredient of the sandwiches. The bread roll 8 is then directed towards a storage compartment 6. In the lower part of the storage compartment 6 lies a zone 14 which corresponds to the location of a passage for the transfer of the bread roll 8 from part 1A of the dispenser 1 where the bread roll is prepared to part 1B where the sandwich is prepared.

Figure 3:
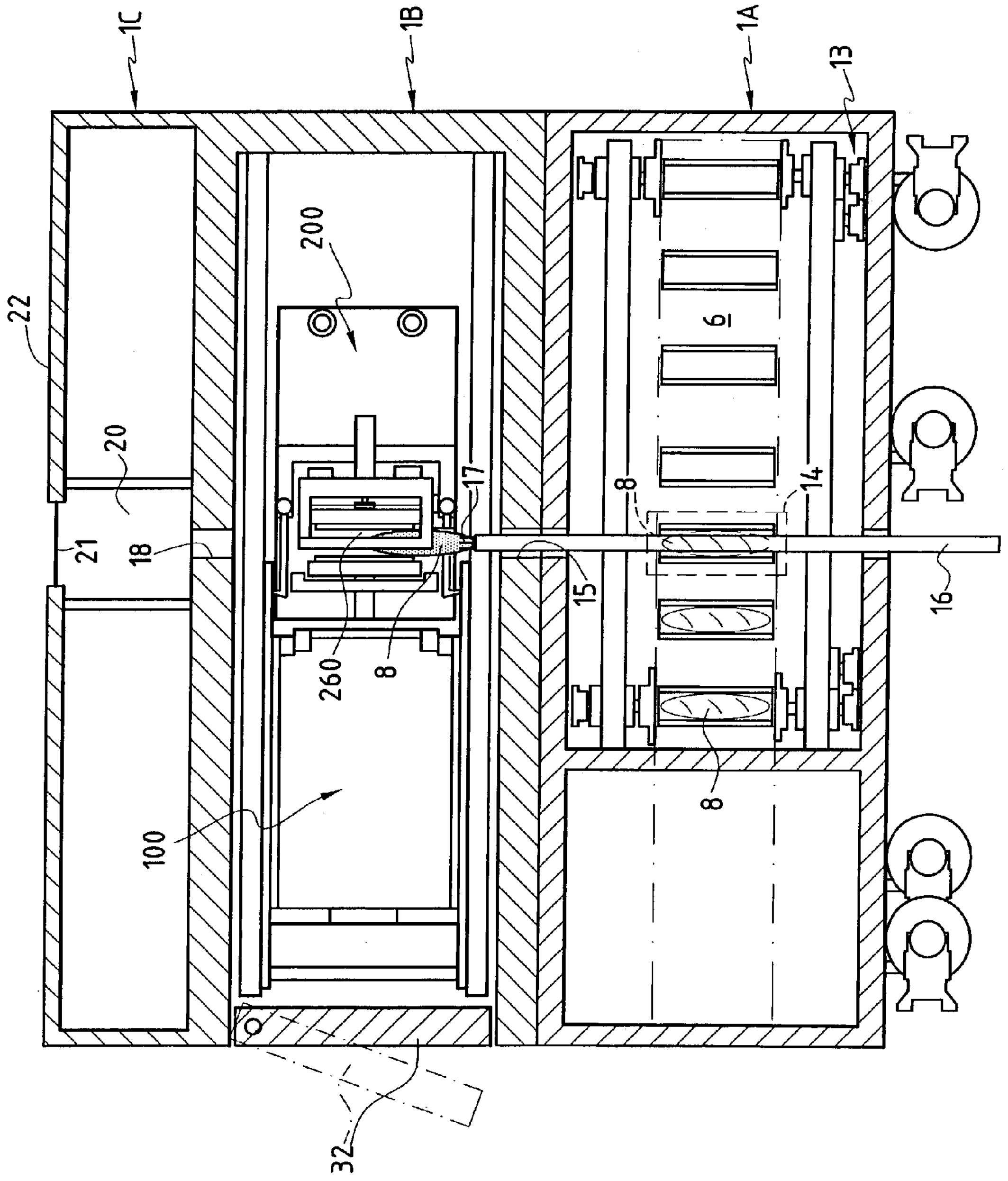
FIG. 3 is a view in horizontal section of the dispenser of FIG. 1 along the plane of section III indicated in FIG. 2.

As shown in FIG. 3, which shows a plan view of the dispenser in section, part 1A where the bread roll is prepared and part 1B where the sandwich is prepared, are adjacent to each other. By forming a passage 15 between these two parts which corresponds to a position of alignment between a mould 11 of the conveyor chain and a tray 260 of the sandwich preparation system 200, the bread roll 8 may be transferred, for preparation of the sandwich, by means of a pusher 16. The pusher 16 comprises means (not shown) for moving in translation and in rotation with respect to its axis. The pusher 16 further comprises barbs 17 at its end in order to hold the bread roll 8. In this way, thanks to the means for rotating the pusher 16, the bread roll 8 makes a rotation through 90° during its transfer. This makes it possible to place the bread roll in the correct position to be cut and to receive the ingredients which will compose the sandwich. Another passage 18, made between parts 1B and 1C of the dispenser, allows the prepared sandwich to be transferred, with the aid of pusher 16, onto a support 20 accessible to the consumer by opening the flap 21.

Figure 4:
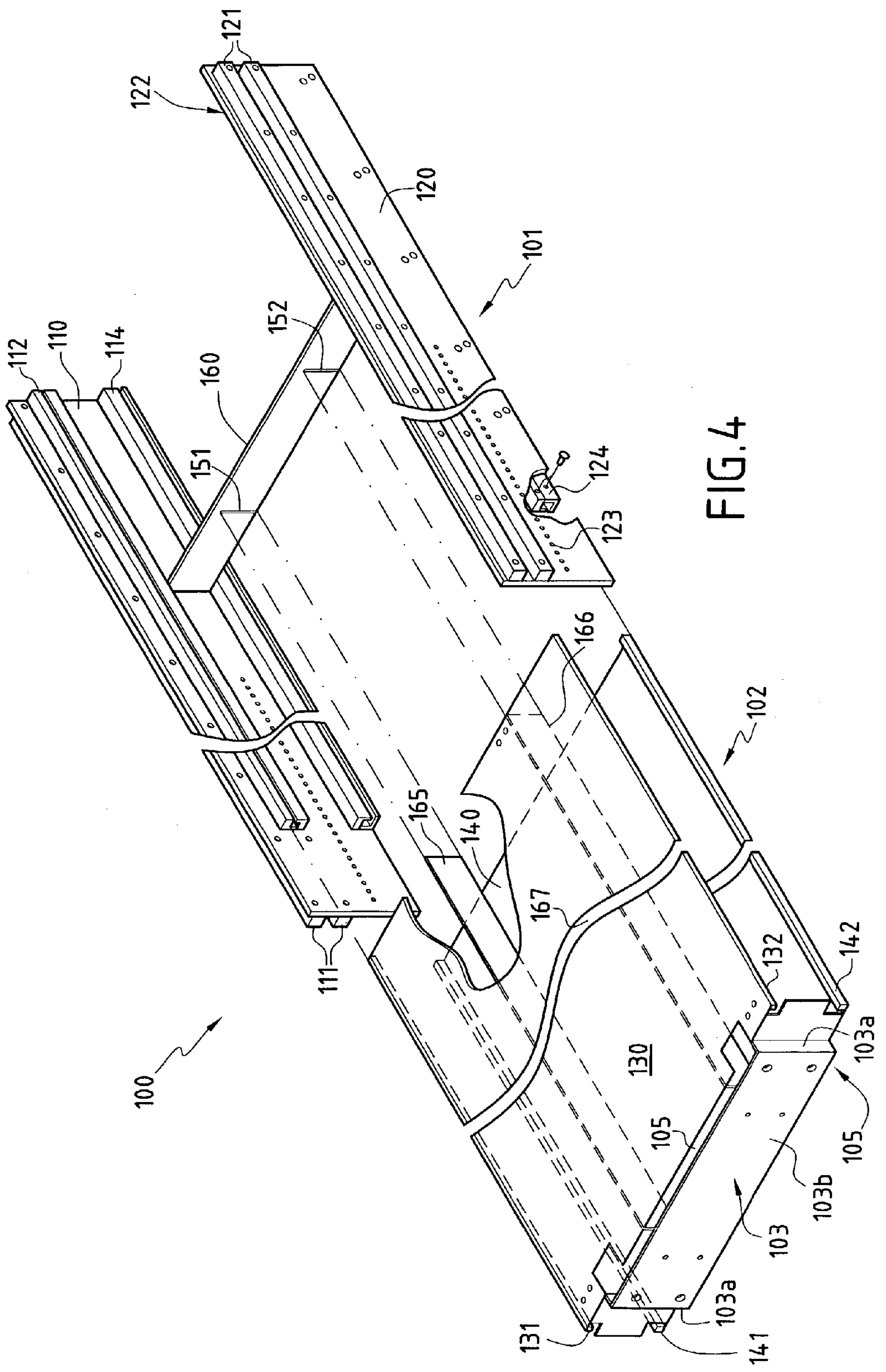
FIG. 4 is a view in perspective, before assembly, of an ingredient storage compartment in accordance with a form of embodiment of the invention.

FIG. 4 shows a form of embodiment of a storage compartment 100 according to the invention. The compartment 100 is formed by first and second assemblies 101 and 102, the second assembly 102 being able to slide inside the first assembly 101.

The first assembly 101 is formed by first and second supporting elements 110 and 120 which are maintained parallel to each other by a plate 160. The ends of the plate 160 are fixed on the inner wall of each of the supporting elements 110 and 120. The length of the plate 160 disposed perpendicularly to the supporting elements 110 and 120 defines the spaced apart relationship between these two elements necessary to receive the second assembly 102.

The second assembly 102 of the compartment 100 is formed by three parts: an upper plate 130, a lower plate 140, both fixed to a front wall 103.

Each supporting element 110, 120 respectively comprises on its inner wall two slideways 112, 114; 122, 124, respectively. The upper plates 130 and 140 comprise at each of their lateral ends guiding portions 131 and 132; 141, 142, respectively, which cooperate with the slideways 112 and 122; 114 and 124, respectively. More precisely, as illustrated in FIG. 4, the guiding portions 131 and 132 of the upper plate 130 engage in slideways 112 and 122 while the guiding portions 141 and 142 of the lower plate 140 engage in slideways 114 and 124.

In this way, the second assembly 102 of the storage compartment 100 slides between the two supporting elements 110 and 120 of the first assembly 101 in order to allow the storage space 167 of the compartment to be monitored as a function of the quantity of ingredient present therein. In effect, since the plate 160, which forms the bottom of the compartment, is fast with the two elements 110 and 120, the slide of the second assembly 102 relative to the first assembly 101 will reduce the storage space 167 of the compartment by the front wall 103 moving towards the plate 160.

The two supporting elements 110 and 120 each comprise a third slideway 111, 121, respectively, fixed on the outer wall thereof. These outer slideways are intended for the positioning and manipulation of the compartment 100 along rails arranged in the automatic sandwich dispenser.

The second assembly 102 presents an opening 105 at its front part. This opening is formed, on the one hand, by symmetrical cut-outs made in the upper and lower plates 130 and 140 and, on the other hand, by the front wall 103 which comprises setbacks 103*a* on each side, defining a central part 103*b* which is offset with respect to the end of the plates 130 and 140. The opening 105 thus defined allows a cutting tool of the automatic sandwich dispenser to pass right through the assembly 102 perpendicularly to the plates 130 and 140 in order to proceed with slicing the ingredients which are stored in each device 100.

The second assembly 102 further comprises two guides 165 and 166 disposed over the length of the lower plate 140 perpendicularly thereto. These two guides define the width of the space 167 in which .the ingredients are stored. The guides 165 and 166 are fixed with respect to the second assembly 102. To that end, the guides may be fixed on the front wall 103 of the second assembly and/or on the lower plate 140. In order not to hinder slide of assembly 102 in assembly 101 and to allow the storage space 167 of the compartment to be monitored, the two guides 165 and 166 pass respectively in notches 151, 152 made in the plate 160. In this way, when an ingredient is consumed by slicing in opening 105, the front wall 103 can be pushed, this displacing the whole assembly 102 rearwardly, including the guides 165 and 166 which then pass through the plate 160 via the notches 151 and 152. This makes it possible to fill the space created in the compartment by the matter of the ingredients which has been sliced in order that a part of these latter always be present in the opening 105. This type of slide presents the advantage of always being able to reposition ingredients in the opening 105 after slicing without having to push the ingredients directly. This solution advantageously avoids any manipulation of the ingredients between the packing and slicing, which, taking into account the fragility of certain ingredients (tomatoes, eggs . . . ), is appreciable in order to ensure their stability in the course of the sandwich making process.

Figure 5:
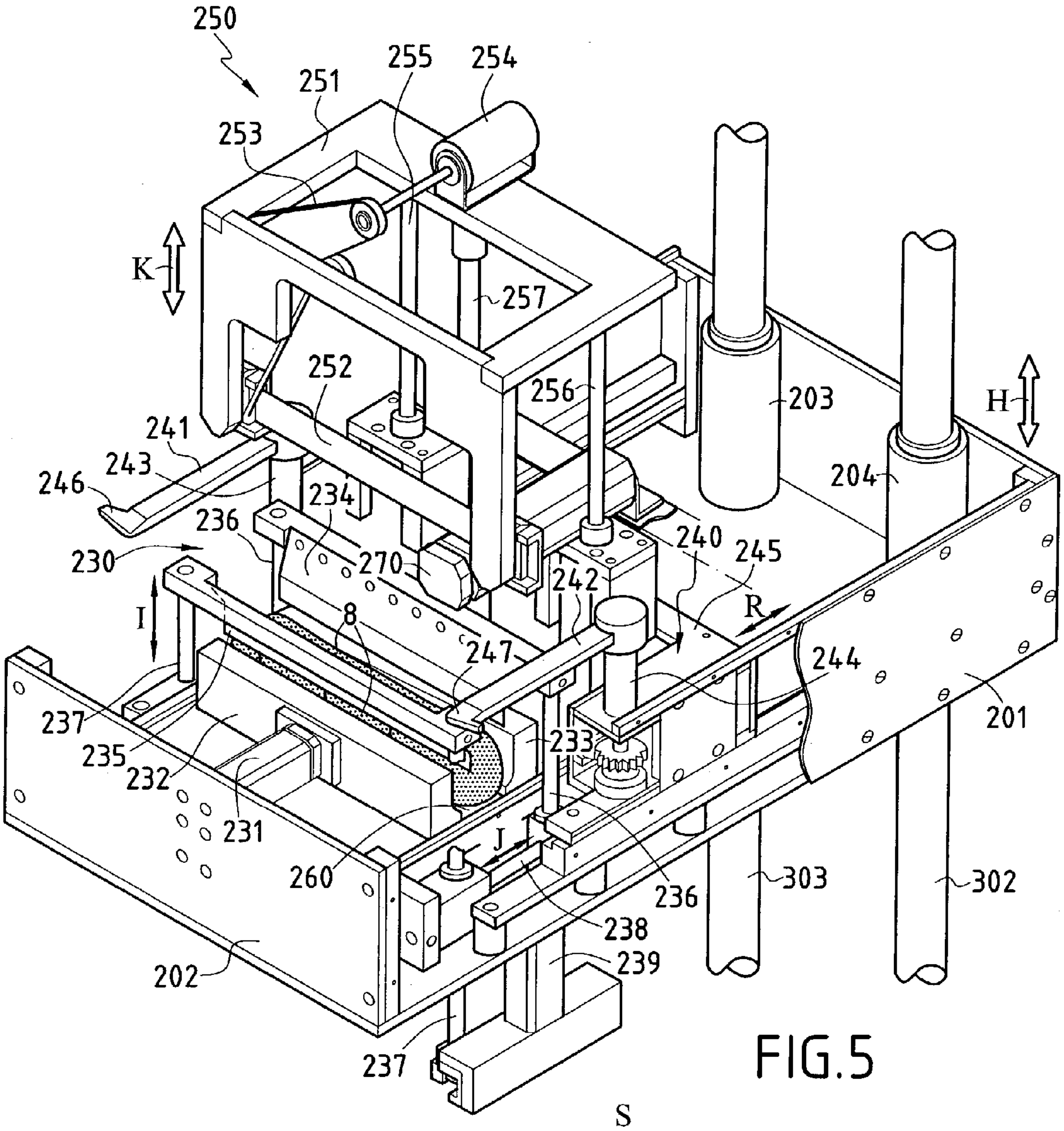
FIG. 5 is a view in perspective of the system for automatically preparing sandwiches in the dispenser according to the invention.

FIG. 5 shows a detailed view of the sandwich preparation system 200. The sandwich preparation system 200 is in the form of a casing 201 which moves, as illustrated in FIG. 5, in a direction H along two rails 302, 303. The system 200 principally comprises three mechanical devices which participate in the making up of the sandwich: a device 230 for positioning the bread roll, a device 240 for manipulating the ingredient compartments, and a device 250 for cutting the ingredients.

The bread roll positioning device 230 comprises a tray 260 on which the bread roll 8 is disposed. Two walls 232 and 233 are intended to maintain the bread roll 8 in place on the tray 260. The wall 232 is a mobile wall which moves over the surface of the tray with respect to the wall 233 by means of a jack 231. The device 230 also comprises a pair of spreader elements 234, 235. The two spreader elements 234, 235 are respectively mounted on two rods 236, 237 which, under the action of a jack 239, rise or descend in a direction I. Under the action of another jack 238, the spreader element 235 is also mobile with respect to spreader 234 in a direction J perpendicular to direction I.

The cutting device 250 is formed by a frame 251 which comprises a cutter 252. The cutter 252 oscillates in translation by means of a reciprocating rotary motor 254 which transmits the movement to the cutter by a belt 253. This makes it possible to give the cutter 252 a reciprocating movement to produce the cutting action. The frame 251 is supported by two rods 255, 256 which guide its displacement under the action of a jack 257 in a direction K parallel to direction I. The action of jack 257 will allow the cutter 252 to be brought closer to or away from the bread roll or the ingredients to be sliced.

Figure 5A:
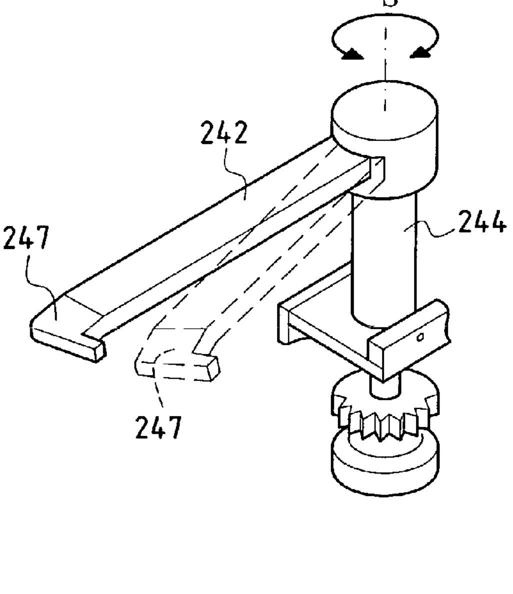
FIG. 5A is an enlarged view in detail of an arm of the system of FIG. 5.

The device 240 for manipulating the ingredient compartments comprises two arms 241 and 242 each provided with an end 246, 247 adapted to cooperate with orifices 113, 123 in the ingredient compartment 100. The other end of the arm 241, 242 respectively, is fixed to a shaft 243, 244, respectively. As shown in FIG. 5A, the shafts 243 and 244 are controlled in rotation in a direction S which makes it possible to control a movement of opening or of closure of the arms to seize or release a compartment 100. The arms thus provided with rotation means are fixed on each side of a frame 245 which moves forwardly or rearwardly in the casing 201 in a direction indicated by double arrow F. In FIG. 5, the frame 245 is in its position of maximum advance.

The sandwich preparation system 200 further comprises a jack 270 disposed between the cutting device 250 and the bread roll positioning device 230. The function of this jack is to push the front wall 103 of the ingredient compartment 100 when a part of the ingredient has been sliced.

Figure 6:
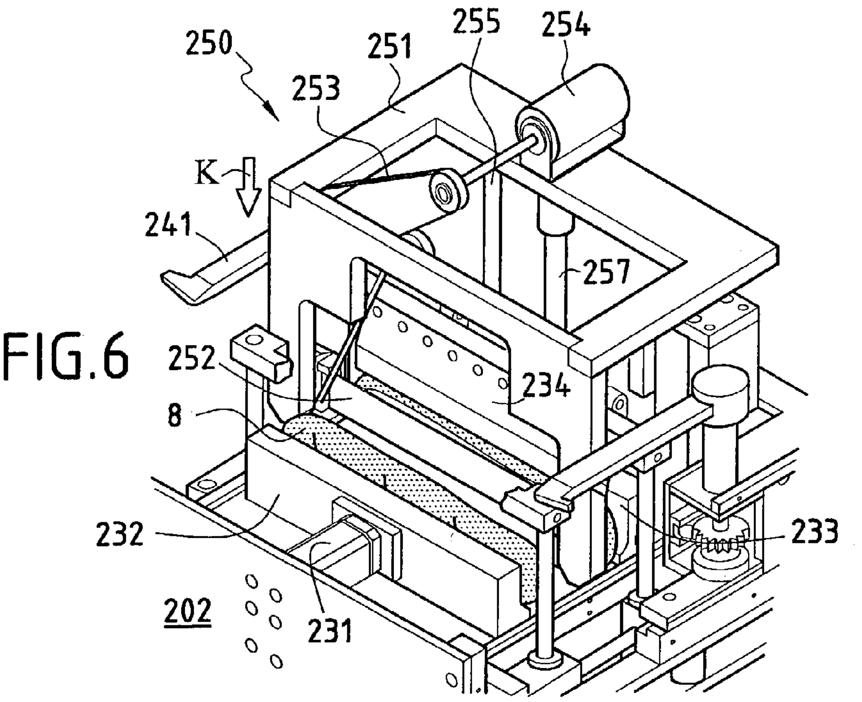
FIGS. 6 and 7 are views in perspective of a part of the system of FIG. 5.
Figure 7:
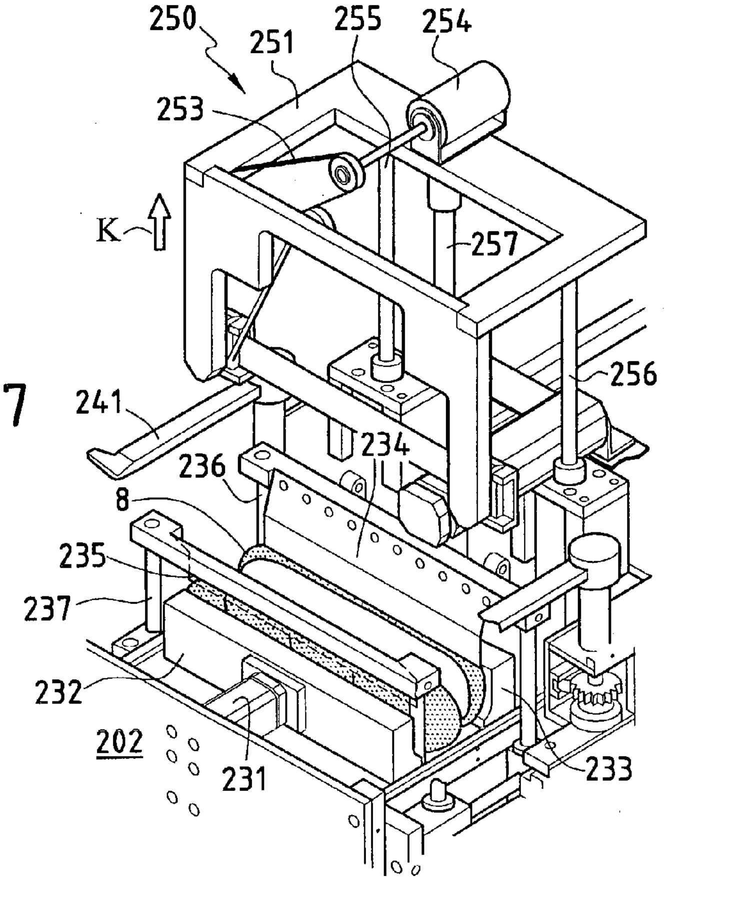

The phase which consists in opening and positioning the bread roll 8 with a view to preparing a sandwich will now be explained. As has been seen in FIG. 3, the bread roll 8 is transferred on the tray 260 by means of the pusher 16 which positions it (including rotation through 90°) so that the side of the bread roll is vertical with respect to the cutter 252. As illustrated in FIG. 5, the wall 232 is then advanced towards wall 233 by the jack 231 in order to hold the bread roll 8 during the withdrawal of the pusher 16. The motor 254 is then started in order to drive the cutter 252 and the jack 257 is actuated in order to lower the cutter onto the bread roll to cut it open, as shown in FIG. 6. When the cutter is sufficiently lowered to separate the bread roll into two parts, the cutter is lifted by actuating the jack 257. The joined spreader elements 234, 235 are then positioned in the opening of the bread roll. In combination with the rearward withdrawal of the wall 232, the spreader elements are separated by the actuation of the jack 238 as illustrated in FIG. 7. This latter configuration of the bread roll positioning device 230 will be conserved during the whole preparation of the sandwich, as this separated position of the spreader elements 234, 235 makes it possible not only to maintain the two pieces of bread roll spaced apart in order to receive the ingredients, but also to guide the slices of ingredients inside the bread roll.

The operation which corresponds to the preparation of the sandwich proper, i.e. the operation which consists in filling the bread roll with the ingredients selected by the consumer, will be described with reference to FIGS. 8 to 12. As may be seen in FIG. 12, a plurality of compartments 100 are disposed one above the other in the sandwich preparation part 1A of the dispenser. Thanks to a refrigeration device 304 placed inside part 1B, this latter forms a refrigerated enclosure in order to conserve the ingredients stored in the compartments. Each compartment is maintained by means of two rails 306 in which engage the slideways 111 and 121 fixed on the outer walls of the compartment 100. Each compartment 100 may thus slide in a direction M along the rails 306 on which it is positioned. The displacement and positioning of the compartments 100 on the rails 306 may be assisted by a friction-type system 305. The compartments 100 are loaded in the dispenser by an operator. To that end, the operator opens the door 32 (shown in FIGS. 1 and 3) in order to access the interior of the part 1B and positions each compartment on the corresponding pair of rails 106.

Figure 8:
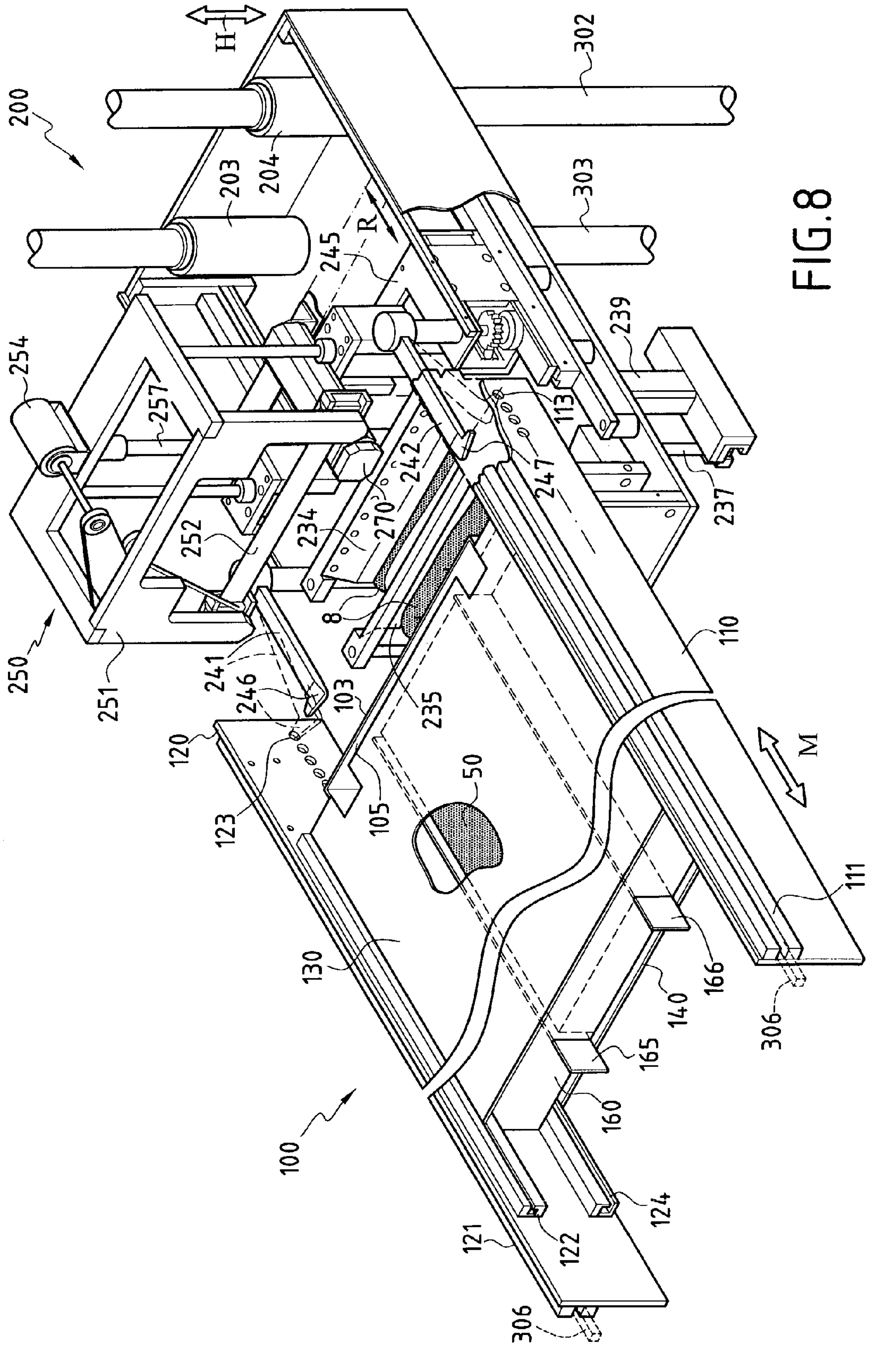
FIGS. 8 and 9 are views in perspective of the automatic sandwich preparation system and of an ingredient storage compartment according to the invention.
Figure 12:
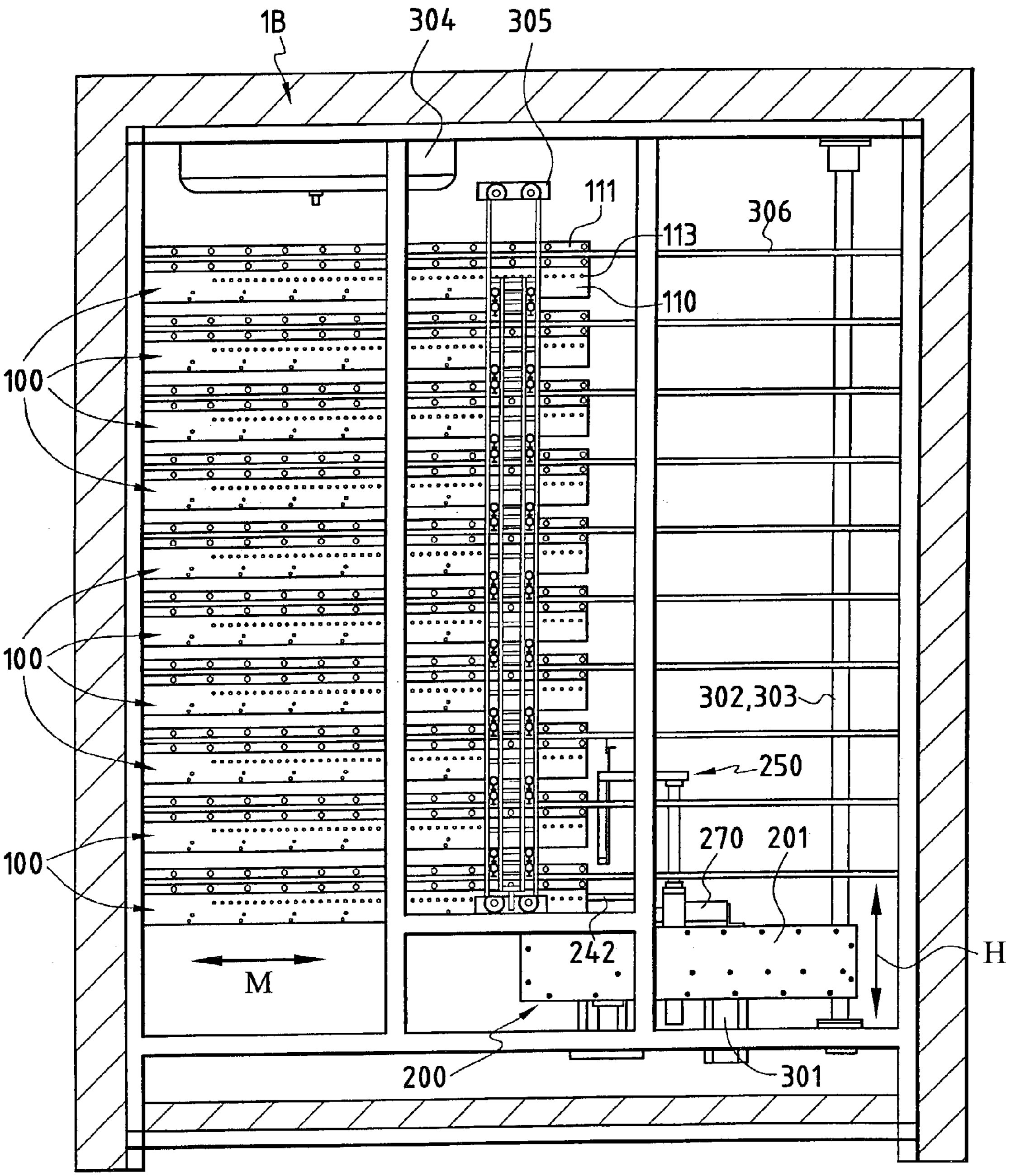
FIG. 12 is a view in vertical section of part 1B of the automatic sandwich dispenser according to a form of embodiment of the invention, and FIG. 13 schematically shows the system for supplying a plurality of automatic sandwich dispensers according to the invention.

When the consumer has selected all the ingredients that he wishes to have in his sandwich, the processing means of the machine 1 will then control a valve 301 in order to displace the system 200 in the direction H and to position it opposite each compartment which comprises one of the ingredients selected. In FIG. 12, the system 200 is in its lowermost position, i.e. opposite the lowest compartment in the dispenser. The positioning of the system 200 opposite a compartment corresponds to the position of the system 200 in which the arms 241 and 242 are aligned with the orifices 113 and 123 of the compartment. This position is illustrated in FIG. 8. In this Figure, it is effectively seen that the ends 246 and 247 of the arms are respectively aligned with the orifices 113 and 123 of a compartment 100. With reference to FIG. 12, it is observed that the arms of the system 200 lie between the two supports 110 and 120 of the compartments. Consequently, in order not to hinder the displacement of the system 100 in direction H, the arms 241 and 242 are maintained in a closed position (in solid lines in FIG. 8) during the displacement of system 200. On the other hand, once the system 200 is positioned opposite a compartment 100, the arms 241 and 242 are open (in dotted lines in FIG. 8) in order to engage their respective ends 246, 247 in one of the corresponding orifices 123 and 113. The compartment thus seized by the arms 241, 242 may be drawn towards the cutting device 250 by movement of the frame 245 towards the rear of the system in the direction R and over a fixed distance d. The compartment 100 is then in a position illustrated in FIG. 9. In this position, the frame 245 has moved back until the opening 105, in which the ingredient 50 appears, is located vertically with respect to the cutter 252.

Figure 9:
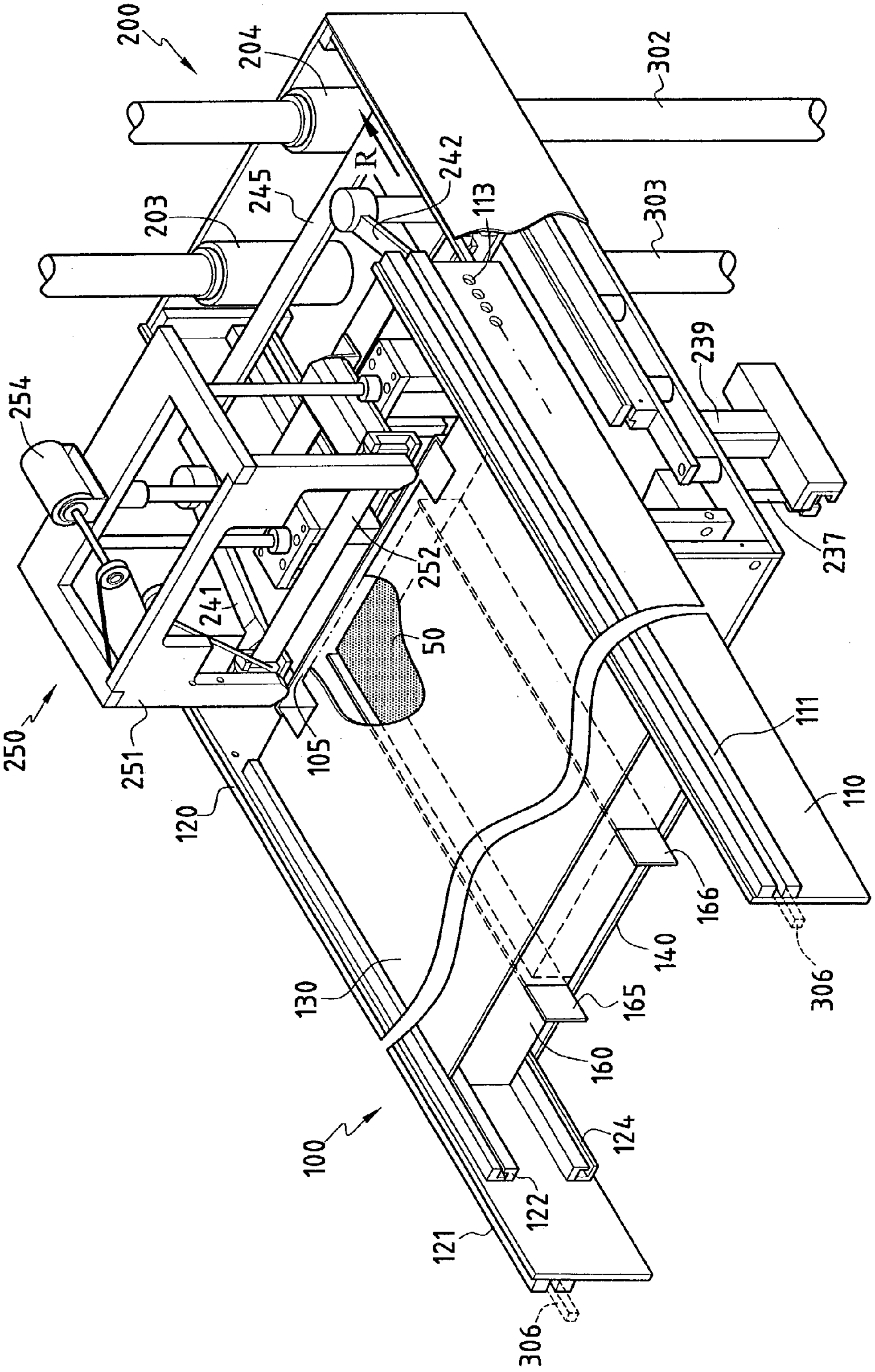
Figure 10:
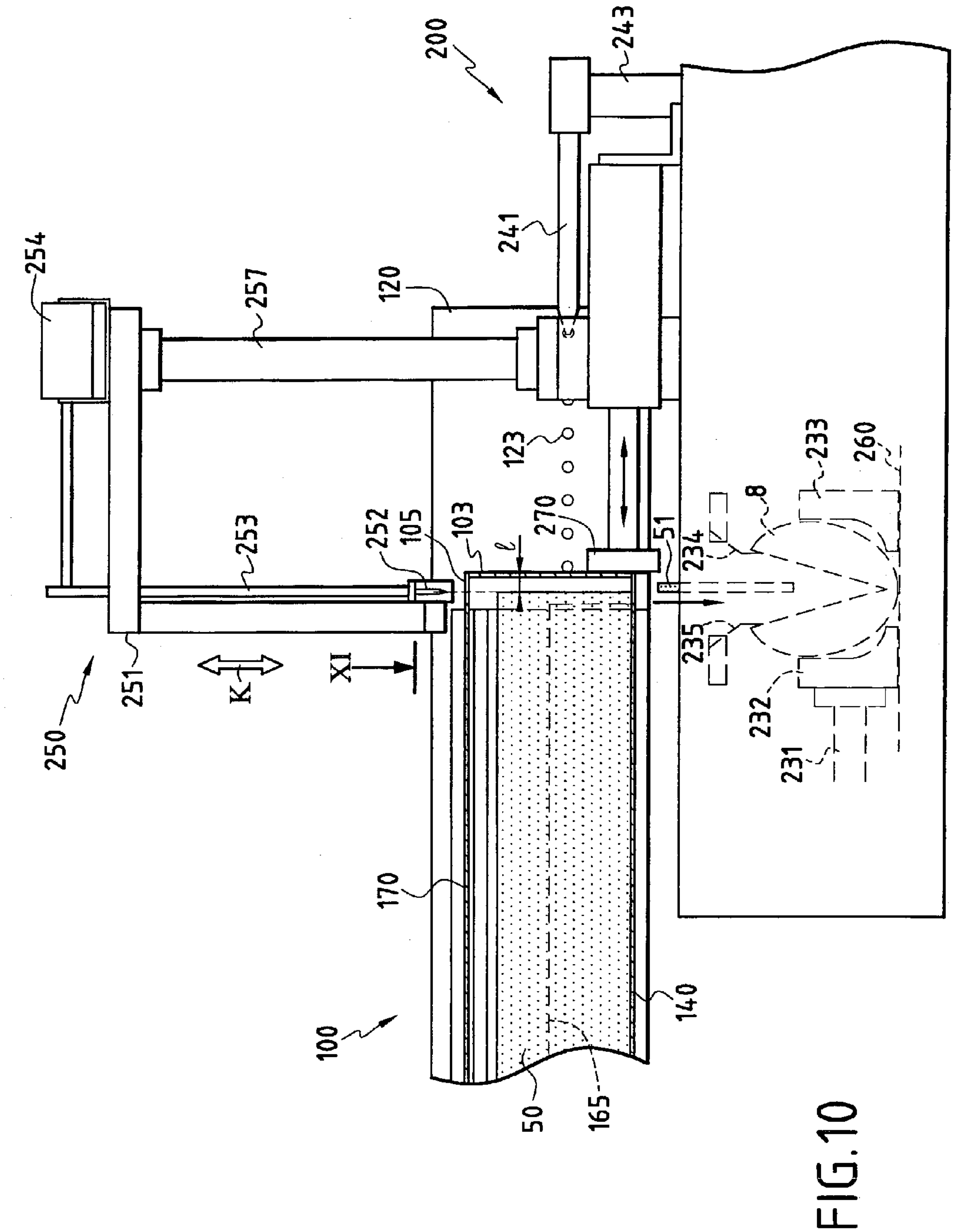
FIG. 10 is a schematic partial side view of the automatic sandwich preparation system and of an ingredient storage compartment of FIG. 9.
Figure 11:
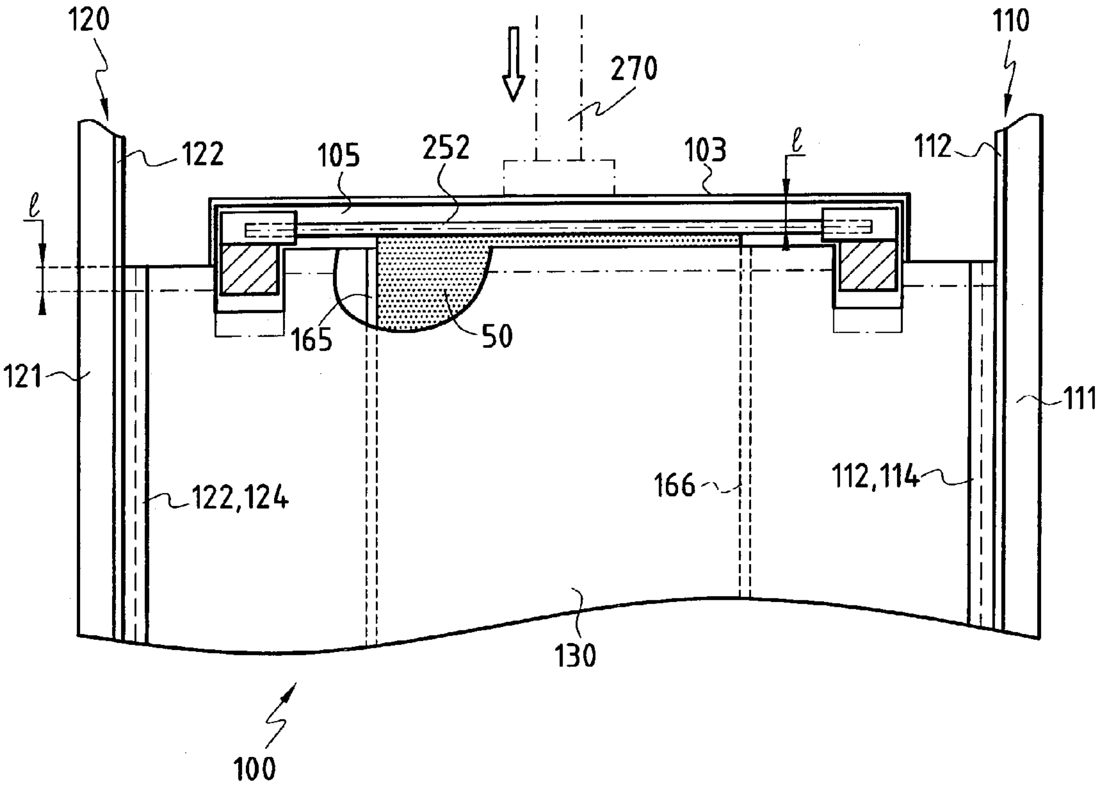
FIG. 11 is a partial plan view of the automatic sandwich preparation system and of an ingredient storage compartment of FIG. 9.

When the compartment is in the position of FIG. 9, the motor 254 is then switched on in order to power the oscillating cutter 252 and to actuate the jack 257 in order to lower the cutter in the opening 105. As illustrated in FIG. 10, a slice 51 of the ingredient 50 is then cut off and deposited in the bread roll 8 between the spreader elements 234 and 235. In order to guarantee that the ingredient 540 has been completely sliced, the cutter 252 is lowered beyond the ingredient until it leaves the opening 105 at the level of the lower part of the compartment. The cutter is then raised again up to its initial position. The ingredient 50, of which a part 51 has been sliced off, is therefore no longer in contact with the front wall 103 of the compartment 100. More precisely, there exists a space between the ingredient and the wall of which the width 1 corresponds to the thickness of the slice 51. Consequently, before the ingredient 50 can be sliced again, it must be repositioned in the opening 105. This repositioning is effected by the jack 270 which pushes the front wall 103 until it is again in contact with the ingredient. In other words, the jack 270 pushes the front wall 103 over the distance 1. This has for consequence the rearward displacement, over the distance 1, of the whole assembly 102 with respect to assembly 101 of the compartment 100 as shown in FIG. 10. When this operation is executed, the compartment may be either returned into its stowed position, i.e. in vertical alignment with the others as in FIG. 12, or used again in order to cut another slice of the ingredient that it contains. In the former case, it suffices to control the forward displacement of the frame 245 over a distance equal to distance d less distance 1. This makes it possible to maintain the openings 105 of all the compartments in the same vertical plane. In this way, at every fresh slicing operation, the recoil of the frame 245 in order to position the opening 105 vertically with respect to the cutter 252 will be identical, i.e. always over distance d.

In the case of an additional slicing, before lowering the cutter to slice the ingredient again, the compartment 100 must be repositioned so that the cutter 252 lies vertically with respect to the opening 105 again. This is effected by closing the arms 241, 242 in order to disengage their respective ends 246, 247 from the orifices 113, 123 in which they were engaged, by advancing the frame 245 until the ends 246, 247 lie in register with the following orifices 113, 123, and by recoil of the frame to its previous position. One is then in the position of FIG. 9, except that the guides 165 and 166 and the end of the upper and lower plates 130 and 140 project from the rear wall 160 by an additional length equal to the filled width 1 at the front of the compartment.

According to a variant embodiment, after the ingredient has been sliced and the front wall pushed, the forward displacement of the frame 245 is controlled over the distance d to return to the position of FIG. 8. In that case, the processing means of the dispenser calculate the distance over which the frame 245 must be moved back for the opening 105 to lie vertically with respect to the cutter 252. In a particular form of embodiment, the distance between each orifice 113, 123 may be defined to correspond to the distance 1 or to a multiple thereof so as to allow the positioning of the compartment by the arms 241, 242 opposite the cutter as the ingredient is consumed. In effect, since, whenever an ingredient is sliced, the front wall 103 is pushed, thus making the assembly 102 recoil with respect to assembly 101, the distance between the opening 105 and the cutter increases accordingly. Since the recoil stroke of the frame 245 is limited, the positioning of the compartment with respect to the cutter must thus be effected several times as soon as a determined quantity of ingredient will have been consumed. By way of example, the distance between each orifice may be adjusted to correspond to the width 1 of a slice of ingredient. When the compartment is first used, once the system 200 is positioned thereopposite, the arms 241 and 242 are thus engaged in the first orifices 123 and 113 as in FIG. 8. The frame 245 is then moved back until the opening 105 is vertical with respect to the cutter as in FIG. 9. The maximum stroke of recoil of the frame 245 may be adjusted over this distance. Once the ingredient has been sliced and the jack 270 has pushed the assembly 102 over distance 1, the processing means memorize this offset. Consequently, when this compartment is next used, the memorized offset information will be taken into account by the processing means to control a first displacement of the compartment by a distance 1 corresponding to the distance between two orifices, then, after having returned the frame into its starting position having previously closed the arms, a second displacement over the maximum stroke as during the first use. In this way, the opening 105 is again located vertically with respect to the cutter. In general, the processing means permanently memorize for each compartment the number n of slices of ingredient already cut in order to calculate the distance n*1 to be taken into account for positioning the compartment for the cut.

In a particular embodiment, the value of the distance 1 (thickness of slice) may vary as a function of the nature of the ingredient. In that case, the processing means memorize the value 1 peculiar to each compartment in order to be able to control the displacement of the latter as a function of this specific value. To that end, the ends 246, 247 of the arms 241, 242 are replaced by electromagnets and, in order not to limit the minimum distance of displacement to a fixed distance between two orifices, the inner parts of the two supports 110 and 120 of the compartments are provided with metal strips in place of the orifices 113, 123 in order to allow the compartments to be fastened by the electromagnets.

When the bread roll 8 is filled with all the ingredients selected, the wall 232 is displaced by the jack 231 in order to close the bread roll 8 on the sliced ingredients. The sandwich is then gripped by the pusher 16 (cf. FIG. 3) which pushes the sandwich on a support 20 accessible to the consumer. The consumer can then obtain his sandwich by opening the flap 21. A sachet dispenser (not shown) may be provided in part 1C of the dispenser.

The bread rolls 8 can be defrosted and baked automatically by means of a programme supervising the storage time of the bread rolls 8. This makes it possible to renew the bread rolls available for the preparation of a sandwich at the end of a certain storage time in order always to deliver a sufficiently fresh bread roll.

For the ingredients which are kept in the compartments 100, means may be provided to detect when a compartment is empty, or about to be. As the ingredient is consumed in the compartment, the assembly 102 moves towards the rear of the assembly 101 until there is no longer any ingredient between the front wall 103 and the plate 160. Consequently, a sensor detecting the position of the assembly 102 with respect to assembly 101 might be provided in each compartment in order to alert the processing means of the dispenser as to the imminent lack of an ingredient in the compartment. Alternately, sensors may be provided, which indicate the position of the ends of the supports 110 and 120 of each compartment in the dispenser. In this way, an operator may interrogate the machine to know the state of the stocks of ingredients. Since the initial length of the space 167 is known and identical for all the compartments, the quantity of ingredient present in each compartment may also be monitored by the processing means simply by subtracting the memorized distance n*1 from the initial length of the space 167. Finally, when sensors detecting the position of ends of the supports 110, 120 are used, the remaining quantity of ingredient may be monitored by measuring the distance covered by the supports and taking into account the memorized value 1 for each compartment and peculiar to each ingredient.

Concerning the management of the freshness of the ingredients stored in the compartments inside the machine, the processing means can memorize the storage time for each compartment and alert an operator after a limited conservation time has been exceeded. Such supervision may be carried out thanks to identification means (bar code, electronic chip, etc . . . ) provided on each compartment. In effect, from these identification means and with suitable reading means in the dispenser, the processing means can identify the type of ingredient contained in the compartment and register the date on which the compartment is placed in the machine, in order to calculate the use-by date of the ingredient in the machine.

Figure 13:
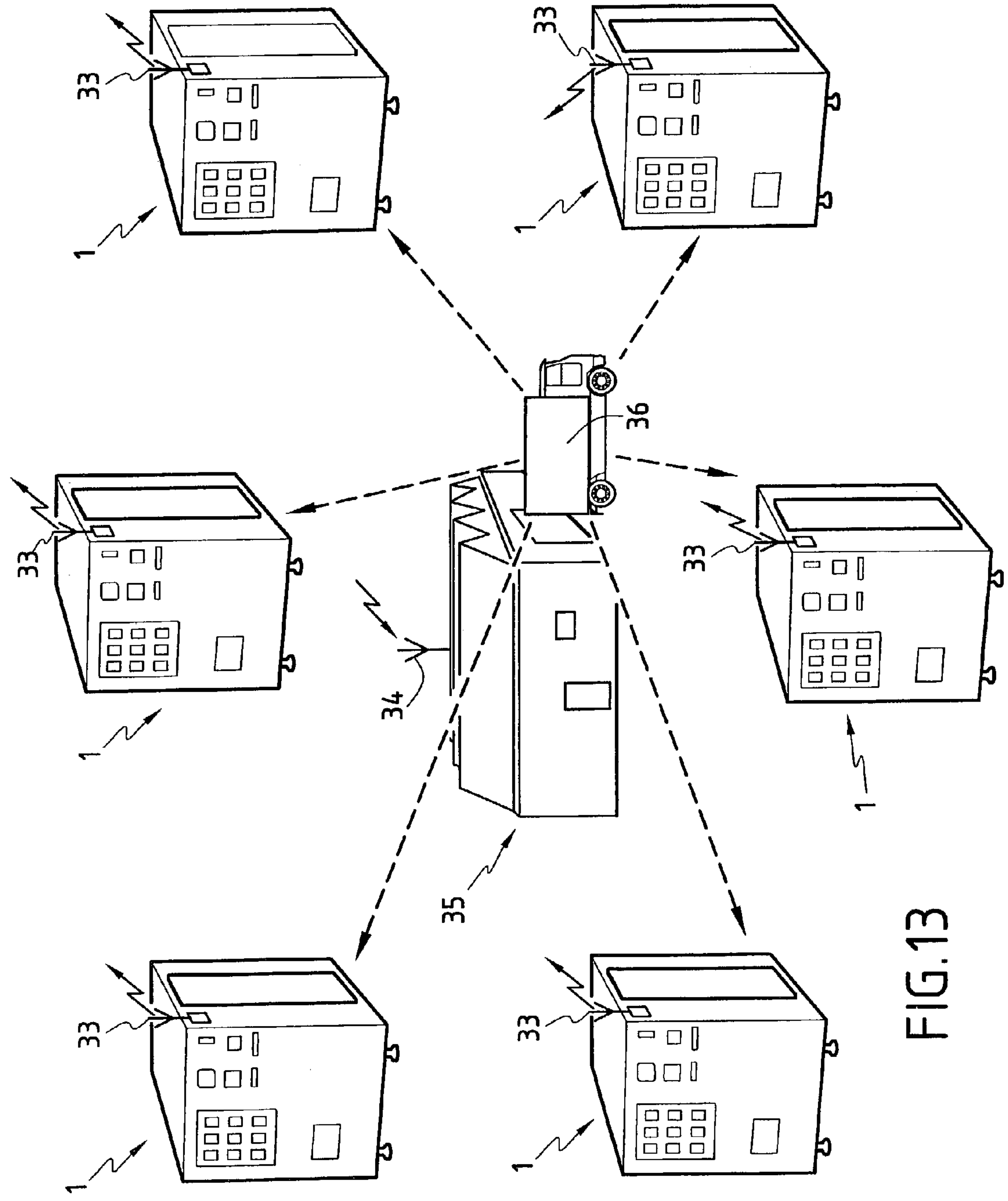

Thanks to the compartment 100 of the present invention, a very economical method of supply of the dispensers according to the invention may be carried out. In effect, as described hereinabove, once the ingredient has been disposed in the compartment and the latter has been placed in an automatic sandwich dispenser of the present invention, all the other operations necessary for making and dispensing the sandwiches are effected automatically by the dispenser. Consequently, the invention presents the advantage of limiting human intervention to filling the compartments and placing them in the dispensers. As illustrated in FIG. 13, the method of management or of supply of the machines can be carried out from a centre 35 for filling the compartments with ingredients. In this centre, fresh ingredients such as tomatoes, ham, dry sausage (salami), butter, etc . . . are packed in the compartments 100. To that end, the ingredients may be disposed in the space 167 defined between the guides 165 and 166 of the assembly 102 before the latter is fitted with assembly 101 to form the compartment 100 (FIG. 3). Alternately, means for access to the space 167, such as a pivoting lid, may also be provided on the upper (130) or lower (140) plate in order to place the ingredient in the compartment 100 already assembled.

When all the compartments are filled, they are loaded into a refrigerated vehicle. For a given geographical sector, all the machines included in this sector can thus be supplied by one and the same operator. The method of supply proposed therefore presents a considerable economic advantage, as one operator can manage a plurality of dispensers on his own.

Concerning the management of the stocks of ingredients present in the machines as explained hereinabove, each machine can comprise transmission means 33 linked to the processing means in order to send to the centre 35 in real time information as to the stocks of ingredients with a view to ordering filling of new compartments before the operator does his rounds. To that end, the centre 35 presents a suitable reception means 34. In this way, by processing the information permanently received at the centre 35, optimal management of the stocks in real time may be effected so that the operator's vehicle is loaded before each round with the quantity and variety of ingredients necessary at that moment. The transmission means 33 and 34 may, for example, be of radio-frequency type. The transmissions between the dispensers and the centre may equally well be effected via telephone links by equipping each dispenser with a modem which can be connected to a server present at the centre 35.

The average time taken for a sandwich to be made, i.e. between the order by the consumer and the delivery of the made up sandwich, is about 2 minutes. This duration depends essentially on the number of ingredients that the consumer has selected.

What is claimed is:

1. Automatic sandwich dispenser intended for fast-food catering, comprising a plurality of compartments for storing and conserving fresh ingredients, a means allowing a consumer to order a sandwich, a means for automatically making a sandwich which comprises a cutting device and which cooperates with said compartments for storing and conserving the fresh ingredients in order, in response to the consumer's order, to slice the fresh ingredients and to fill a bread roll with the slices of ingredients, and a means for delivering the made up sandwich, wherein each compartment comprises a storage element forming a volume for containing the ingredient and comprising an opening adapted to cooperate with the cutting device, said storage element being adapted to slide in the compartment in order to reposition the ingredient in said opening after it has been sliced; and wherein the automatic sandwich making means comprises means for automatically manipulating the storage compartments in order to position the opening vertically with respect to the cutting device and the bread roll.

2. The dispenser of claim 1, wherein the compartments are arranged in a refrigerated enclosure.

3. The dispenser of claim 1, wherein the automatic sandwich making means further comprises a jack for pushing the storage element of the compartment.

4. The dispenser of claim 1, wherein the automatic sandwich making means comprises a holding means for holding the bread roll in a determined position while the sandwich is being made.

5. The dispenser of claim 4, wherein said holding means further comprises a pair of spreader elements for maintaining the bread roll open.

6. The dispenser of claim 1, wherein said ordering means comprise means for selecting the ingredients in order to allow the consumer to choose the composition of the sandwich.

7. The dispenser of claim 1, wherein said ordering means further comprise means for payment.

8. The dispenser of claim 1, further comprising a device for automatically making the bread roll.

9. The dispenser of claim 8, further comprising a means for transferring the bread roll from the automatic bread roll making device to the automatic sandwich making means.

10. The dispenser of claim 1, further comprising a means for transferring the made up sandwich from the automatic sandwich making means to the delivery means.

11. Automatic sandwich dispenser intended for fast-food catering, comprising a plurality of compartments for storing and conserving fresh ingredients, a means allowing a consumer to order a sandwich, a means for automatically making a sandwich which comprises a cutting device and which cooperates with said compartments for storing and conserving the fresh ingredients in order, in response to the consumer's order, to slice the fresh ingredients and to fill a bread roll with the slices of ingredients, and a means for delivering the made up sandwich, wherein each compartment comprises a storage element forming a volume for containing the ingredient and comprising an opening adapted to cooperate with the cutting device, said storage element being adapted to slide in the compartment in order to reposition the ingredient in said opening after it has been sliced; and wherein the automatic sandwich making means further comprises a jack for pushing the storage element of the compartment.

12. Automatic sandwich dispenser intended for fast-food catering, comprising a plurality of compartments for storing and conserving fresh ingredients, a means allowing a consumer to order a sandwich, a means for automatically making a sandwich which comprises a cutting device and which cooperates with said compartments for storing and conserving the fresh ingredients in order, in response to the consumer's order, to slice the fresh ingredients and to fill a bread roll with the slices of ingredients, and a means for delivering the made up sandwich, wherein each compartment comprises a storage element forming a volume for containing the ingredient and comprising an opening adapted to cooperate with the cutting device, said storage element being adapted to slide in the compartment in order to reposition the ingredient in said opening after it has been sliced; and wherein said holding means further comprises a pair of spreader elements for maintaining the bread roll open.

13. Automatic sandwich dispenser intended for fast-food catering, comprising a plurality of compartments for storing and conserving fresh ingredients, a means allowing a consumer to order a sandwich, a means for automatically making a sandwich which comprises a cutting device and which cooperates with said compartments for storing and conserving the fresh ingredients in order, in response to the consumer's order, to slice the fresh ingredients and to fill a bread roll with the slices of ingredients, and a means for delivering the made up sandwich, wherein each compartment comprises a storage element forming a volume for containing the ingredient and comprising an opening adapted to cooperate with the cutting device, said storage element being adapted to slide in the compartment in order to reposition the ingredient in said opening after it has been sliced; and the automatic sandwich dispenser further comprising a device for automatically making the bread roll.

14. The dispenser of claim 13, further comprising a means for transferring the bread roll from the automatic bread roll making device to the automatic sandwich making means.

* * * * *